US010807874B2

(12) United States Patent
Koike et al.

(10) Patent No.: US 10,807,874 B2
(45) Date of Patent: Oct. 20, 2020

(54) MORDENITE ZEOLITE AND PRODUCTION METHOD THEREFOR

(71) Applicants: MITSUI MINING & SMELTING CO., LTD., Tokyo (JP); The University of Tokyo, Tokyo (JP)

(72) Inventors: Natsume Koike, Tokyo (JP); Keiji Itabashi, Tokyo (JP); Shanmugam Palani Elangovan, Tokyo (JP); Tatsuya Okubo, Tokyo (JP)

(73) Assignees: MITSUI MINING & SMELTING CO., LTD., Tokyo (JP); The University of Tokyo, Tokyo (JP)

( * ) Notice: Subject to any disclaimer, the term of this patent is extended or adjusted under 35 U.S.C. 154(b) by 0 days.

(21) Appl. No.: 16/341,545

(22) PCT Filed: Oct. 11, 2017

(86) PCT No.: PCT/JP2017/036892
§ 371 (c)(1),
(2) Date: Apr. 12, 2019

(87) PCT Pub. No.: WO2018/070450
PCT Pub. Date: Apr. 19, 2018

(65) Prior Publication Data
US 2019/0367378 A1 Dec. 5, 2019

(30) Foreign Application Priority Data
Oct. 12, 2016 (JP) .................. 2016-200613

(51) Int. Cl.
*C01B 39/26* (2006.01)
*B01J 20/18* (2006.01)
(Continued)

(52) U.S. Cl.
CPC .............. *C01B 39/26* (2013.01); *B01J 20/18* (2013.01); *B01J 20/186* (2013.01);
(Continued)

(58) Field of Classification Search
CPC ....... C01B 39/26; C01P 2004/34; B01J 29/18; B01J 29/24; B01J 20/18; B01J 29/185;
(Continued)

(56) References Cited

U.S. PATENT DOCUMENTS

| 4,664,898 A | 5/1987 | Arika et al. |
| 2002/0016252 A1 | 2/2002 | Takahashi et al. |
| 2013/0156690 A1 | 6/2013 | Itabashi et al. |

FOREIGN PATENT DOCUMENTS

| JP | 58-217425 A2 | 12/1983 |
| JP | 63-046007 | 9/1988 |

(Continued)

OTHER PUBLICATIONS

Deinnund et al,"Nickel-Exchnaged Zincosilicate Catalysts for the Oligonnerization of Propylene", ACS Catal. 2014, 4, (Year: 2014) 4189-4195.*

(Continued)

*Primary Examiner* — David M Brunsman
(74) *Attorney, Agent, or Firm* — Rankin, Hill & Clark LLP

(57) ABSTRACT

Provided is a mordenite zeolite which can be produced without using an organic structure-directing agent, and has superior multivalent metal cation exchange capability. The mordenite zeolite according to the present invention containing silicon, a divalent metal M and aluminum in a skeletal structure, wherein the mordenite zeolite has the following atomic ratios in the state of Na-form. The mordenite zeolite preferably has a BET specific surface area of 250 $m^2/g$ or more and 500 $m^2/g$ or less and a micropore volume of 0.07 cc/g or more and 0.25 cc/g or less in the state of Na-form or H-form. Si/(M+Al)=5 or more and 10 or less, M/(M+Al)=0.1 or more and less than 1, and Na/(M+Al)=1 or more and less than 2.

14 Claims, 7 Drawing Sheets

PRODUCT OF EXAMPLE 1

(51) Int. Cl.
*B01J 29/18* (2006.01)
*B01J 20/28* (2006.01)
*B01J 35/02* (2006.01)
*B01J 35/10* (2006.01)

(52) U.S. Cl.
CPC ... *B01J 20/28021* (2013.01); *B01J 20/28061* (2013.01); *B01J 20/28071* (2013.01); *B01J 29/185* (2013.01); *B01J 35/026* (2013.01); *B01J 35/1019* (2013.01); *B01J 35/1038* (2013.01); *B01J 2229/183* (2013.01); *B01J 2229/186* (2013.01); *C01P 2002/72* (2013.01); *C01P 2004/03* (2013.01); *C01P 2004/34* (2013.01)

(58) Field of Classification Search
CPC .............. B01J 20/186; B01J 20/28021; B01J 2229/186
See application file for complete search history.

(56) References Cited

FOREIGN PATENT DOCUMENTS

| JP | 63-301834 A | 12/1988 |
|----|-------------|---------|
| JP | 07-124477 A | 5/1995 |
| JP | 08-215575 A | 8/1996 |
| JP | 11-114413 A | 4/1999 |
| JP | 2011-111337 A | 6/2011 |

OTHER PUBLICATIONS

International Search Report (ISR) dated Nov. 21, 2017 filed in PCT/JP2017/036892.

Natsume Koike et al: "Organic-free synthesis of zincoaluminosilicate zeolites from homogeneous gels prepared by a co-precipitation method", Dalton Transactions, vol. 46, No. 33, Jan. 1, 2017 (Jan. 1, 2017), pp. 10837-10846.

Bangda Wang et al: "Insights into the ion-exchange properties of Zn(II)-incorporated MOR zeolites for the capture of multivalent cations", Physical Chemistry Chemical Physics, vol. 21, No. 7, Jan. 1, 2019 (Jan. 1, 2019), pp. 4015-4021.

Iyoki Kenta et al: "Progress in seed-assisted synthesis of zeolites without using organic structure-directing agents", Microporous and Mesoporous Materials, vol. 189, Aug. 19, 2013 (Aug. 19, 2013), pp. 22-30.

Itabashi et al: "A Working Hypothesis for Broadening Framework Types of Zeolites in Seed-Assisted Synthesis without Organic Structure-Directing Agent", Journal of the American Chemical Society, American Chemical Society, US, vol. 134, No. 28, Jan. 1, 2012 (Jan. 1, 2012), pp. 11542-11549.

Extended European Search Report issued in the EP Patent Application No. EP17859495.8, dated Oct. 7, 2019.

* cited by examiner

REFERENCE EXAMPLE 6  ALUMINOSILICATE MORDENITE

SEED CRYSTAL USED IN EXAMPLE 1

PRODUCT OF EXAMPLE 1

PRODUCT OF EXAMPLE 3

PRODUCT OF EXAMPLE 5

1

MORDENITE ZEOLITE AND PRODUCTION METHOD THEREFOR

TECHNICAL FIELD

The present invention relates to a production method of a mordenite zeolite comprising silicon, a divalent metal and aluminum as a metalloid element or a metal element in its skeleton.

BACKGROUND ART

Conventionally, mordenite zeolites containing only silicon and aluminum as a metalloid element or a metal element in its skeleton are known. For example, Patent Documents 1 and 2 disclose production of such a mordenite zeolite by hermetically heating a gel of a particular composition. According to the methods disclosed in Patent Documents 1 and 2, mordenite zeolites can be produced without using an organic structure-directing agent. Since the organic structure-directing agent is not only expensive but also contained in the zeolite pores after synthesis, it is essential to remove it by calcination prior to use, and also for the treatment of exhaust gas and synthesis wastewater. Therefore, it is industrially advantageous to be able to produce mordenite zeolites without the use of an organic structure-directing agent.

Patent Document 1: Japanese Unexamined Patent Application, Publication No. S58-217425
Patent Document 2: Japanese Examined Patent Application Publication No. S63-46007

DISCLOSURE OF THE INVENTION

Problems to be Solved by the Invention

However, conventional mordenite zeolites do not have a sufficiently high polyvalent metal cation supporting ability, and therefore, there was room for improvement in the function as a catalyst or an adsorbent.

Accordingly, it is an object of the present invention to provide a mordenite zeolite which can be synthesized without using an organic structure-directing agent, which can enhance its ability to support polyvalent ions, and which can be used as various catalysts and adsorbents, as well as a method for producing the same.

Means for Solving the Problems

The present invention provides a mordenite zeolite comprising silicon, a divalent metal M and aluminum as a metal element or a metalloid element in its skeleton, and having the following atomic ratios:
Si/(M+Al)=5 or more and 10 or less,
M/(M+Al)=0.1 or more and less than 1, and
Na/(M+Al)=1 or more and less than 2.

Additionally, the present invention provides a production method of the mordenite zeolite, the method comprising the steps of:
(1) preparing a gel of aluminosilicate comprising divalent metal M by mixing an alkaline aqueous solution comprising a silicon source with an acidic aqueous solution comprising a source for the divalent metal M and an aluminum source;
(2) obtaining a reaction mixture by adding a mordenite zeolite as a seed crystal to the gel at a ratio of 0.1% by mass or more and 30% by mass or less relative to the silica component in the gel and adding an aqueous NaOH solution so that molar ratio NaOH/Si is adjusted to 0.35 or more and 0.6 or less and; and
(3) hermetically heating the reaction mixture at a temperature of 100° C. or more and 200° C. or less.

Further the present invention provides a polyvalent metal cation-exchanged body of aluminosilicate mordenite zeolite comprising divalent metal M in its skeleton, as well as a catalyst and an adsorbent comprising the same.

Effects of the Invention

The mordenite zeolite of the present invention is excellent in loading polyvalent metal cations. The polyvalent metal cation-exchanged body of mordenite zeolite of the present invention is useful as a catalyst and an adsorbent. The method for producing the mordenite zeolite of the present invention enables the production of a mordenite zeolite excellent in the polyvalent metal cation supporting ability, by an industrially advantageous method using no organic structure-directing agent.

PREFERRED MODE FOR CARRYING OUT THE INVENTION

Figure 1:
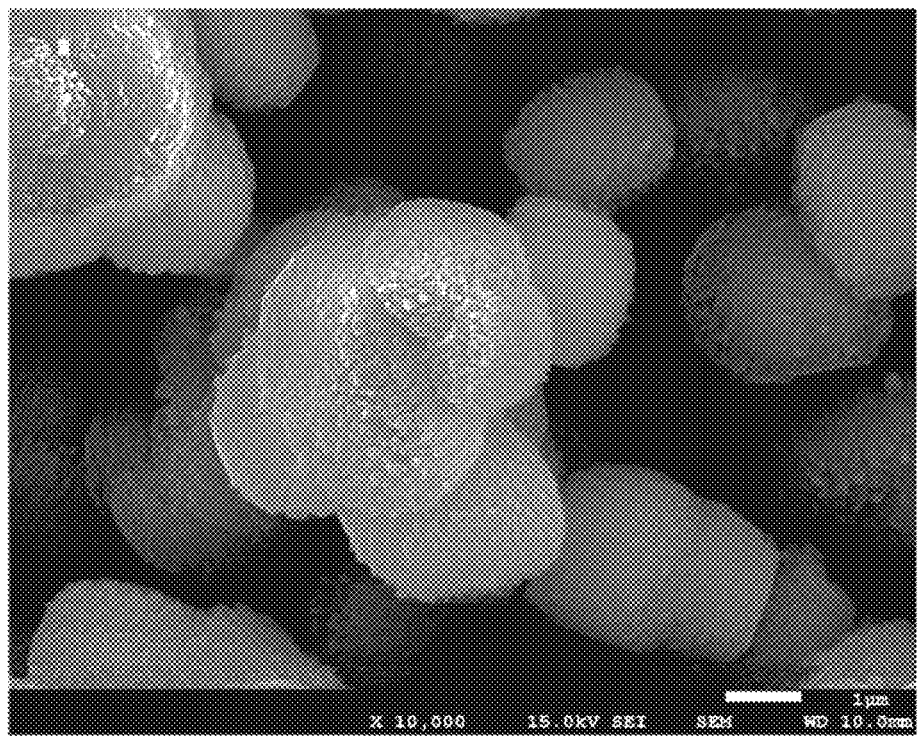
FIG. 1 is an SEM photograph of a product synthesized in Reference Example 6.

Hereinafter, the present invention will be described based on a preferred embodiment thereof. One of the technical features of the mordenite zeolite of the present embodiment is in that silicon, divalent metal M, and aluminum are contained as a metal element or a metalloid element in the skeleton. Note that the metalloid element is a metal exhibiting an intermediate property between a metal and a non-metal in brittleness, semiconducting property, metallic luster, an amphoteric property exhibited by its oxide and the like. Specifically, boron, silicon, germanium, arsenic, antimony, or tellurium are metalloid elements.

Divalent metal M includes a metal which becomes a divalent ion when included in the skeleton of mordenite zeolite, and specifically includes zinc (Zn), cobalt (Co), nickel (Ni), iron (Fe), manganese (Mn), beryllium (Be), magnesium (Mg) and the like. Among them, the divalent metal M is preferably at least one selected from zinc (Zn), cobalt (Co), nickel (Ni), iron (Fe) and manganese (Mn) from the viewpoint of easy production of the mordenite zeolite of the present embodiment without an organic structure-directing agent and stability in the skeleton. These can be used alone or in combination of two or more.

In the mordenite zeolite of the present embodiment, when silicon, divalent metal M and aluminum are all bonded to an oxygen atom in a four coordinate state, the divalent metal M becomes a divalent ion, and thus has a negative charge of minus 2 in the skeleton. When only the divalent metal M is bonded in a three coordinate state, the divalent metal M has a negative charge of minus 1 in the skeleton. Generally, Chemical Science, Vol. 7 (2016), pp. 2264-2274 discloses that when the divalent metal M in a zeolite is zinc (Zn), the divalent metal M tends to be in three coordinate state or four coordinate state described above. When the mordenite zeolite is in a H- or Na-form, in order to compensate for this negative charge, two divalent metals (monovalent cations ($Na^+$ or $H^+$) when zinc or the like is in the state of four coordinate) are ionically bonded. When zinc (Zn) is in three coordinate state, a single monovalent cation ($Na^+$ or $H^+$) is ionically bonded. Meanwhile, since aluminum becomes a trivalent ion, it has a negative charge of minus 1 in the skeleton. To compensate for this negative charge, one monovalent cation is ionically bonded. Therefore, in the mordenite zeolite of the present embodiment containing both divalent metal M and aluminum, the relationship between the amount of (divalent metal M+aluminum) of the entire zeolite skeleton and the amount of cation falls within a value in the range of Na/(M+Al)=1 or more and less than 2, in the case of the Na-form. That is, the ratio Na/(M+Al) is close to 1 when the amount of three coordinate divalent metal M (zinc (Zn) or the like) is large, and the ratio Na/(M+Al) greatly exceeds 1 when the amount of four coordinate divalent metal M (zinc (Zn) or the like) is large. Incidentally, the Na-form means a state in which almost all of the negative charge of the mordenite zeolite is compensated by $Na^+$ and the H-form means a state in which almost all of the negative charge of the mordenite zeolite is compensated by $H^+$.

Another feature of the mordenite zeolite of the present embodiment is characterized in that the atomic ratio M/(M+Al) is 0.1 or more. As the M/(M+Al) atomic ratio in the skeleton increases, the Na/(M+Al) atomic ratio when the zeolite is converted to the Na-form, increases. That is, as the amount of M increases, the overall negative charge of the mordenite zeolite increases, resulting in an increase in the number of cations ionically bonded to anion sites. When the mordenite zeolite is ion-exchanged from the Na-form to the H-form, the amount of solid acid of zeolite increases with an increase in the amount of divalent metal M in the skeleton, and the zeolite advantageously acts as a solid acid catalyst. When the cation of the mordenite zeolite is ion-exchanged with a polyvalent metal cation, for example, with a divalent metal ion, the aluminosilicate containing no divalent metal M in the skeleton requires two intraskeletal Al atoms existing in the vicinity of each other, in order to bind to a single divalent metal ion. On the other hand, in the case of aluminosilicate containing a four coordinate divalent metal M in the skeleton, a single intraskeletal M is bonded to a single divalent metal ion. Therefore, as the amount of intraskeletal M increases, the mordenite zeolite becomes easier to carry more polyvalent metal ions and advantageously acts as an adsorbent or a polyvalent metal ion exchange catalyst.

The atomic ratio M/(M+Al) is less than 1. As described above, the technical feature that not all but a portion of aluminum atoms in the aluminosilicate is replaced with divalent metal M makes the mordenite zeolite of the present embodiment easier to be produced without an organic structure-directing agent.

The atomic ratio M/(M+Al) of the mordenite zeolite is more preferably 0.1 or more and less than 1, and more preferably 0.2 or more and less than 1, from the viewpoint of obtaining a mordenite zeolite having a high polyvalent metal cation-carrying ability and making it easier to produce by using no organic structure-directing agent. From the same viewpoint, the atomic ratio Na/(M+Al) is preferably 1 or more and less than 2, and more preferably 1.2 or more and less than 2.

Further, the mordenite zeolite of the present embodiment has an advantage of relatively high structural stability because the atomic ratio Si/(M+Al) is 5 or more. Further, the atomic ratio Si/(M+Al) of 10 or less renders large negative charge to the mordenite zeolite skeleton, resulting in an advantage to enhance the polyvalent metal cation supporting ability as well as catalyst performance and adsorption performance. From these points, the atomic ratio Si/(M+Al) is preferably 5 or more and 10 or less, and more preferably 5 or more and 8 or less.

The mordenite zeolite of the present embodiment has a BET specific surface area of 250 $m^2$/g or more and 500 $m^2$/g or less and a micropore volume of 0.07 cc/g or more and 0.25 cc/g or less, measured in the state of Na-form or H-form. This is preferred from the viewpoint of enhancing adsorption performance and catalyst performance when the mordenite zeolite is converted to a polyvalent metal cation-exchanged body, and of diffusing molecules in pores. From these points of view, the BET specific surface area of the mordenite zeolite measured in the state of Na-form or H-form is more preferably 250 $m^2$/g or more and 500 $m^2$/g or less, and still more preferably 300 $m^2$/g or more and 500 $m^2$/g or less. In addition, the micropore volume measured in the state of Na-form or H-form is more preferably 0.07 cc/g or more and 0.25 cc/g or less, and still more preferably 0.1 cc/g or more and 0.25 cc/g or less.

The mordenite zeolite is preferably in a form of particles each comprising a shell composed of a solid portion and a hollow portion existing inside the shell. The shape of these particles can be confirmed by observing the mordenite zeolite with a scanning electron microscope (SEM). The magnification at the time of observation is preferably 1,000 times or more and 50,000 times or less.

Figure 4:
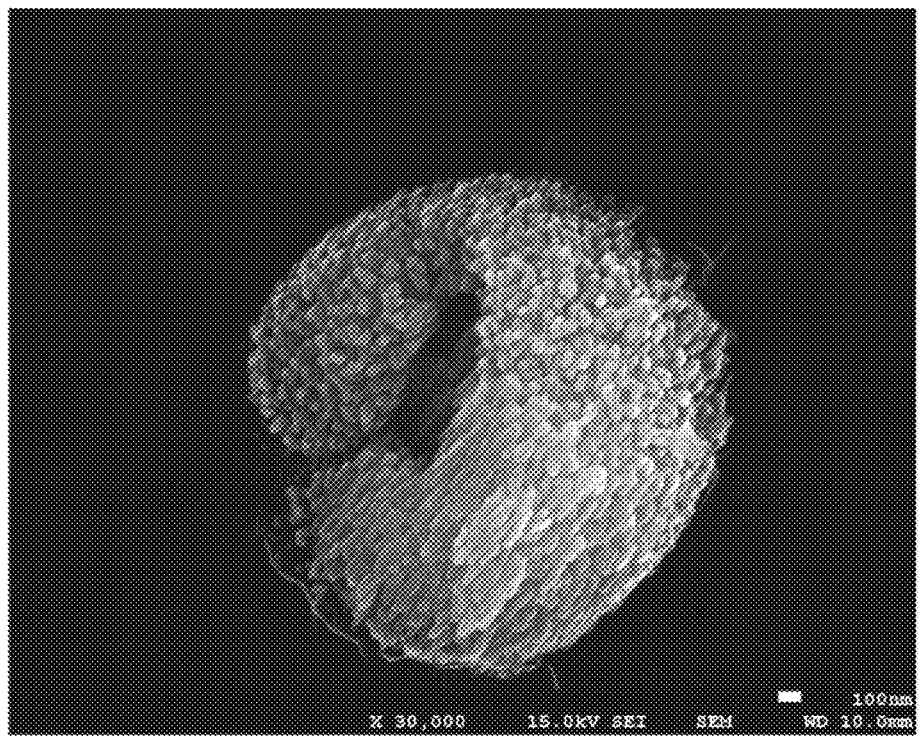
FIG. 4 is an SEM photograph of the product synthesized in Example 1.
Figure 6:
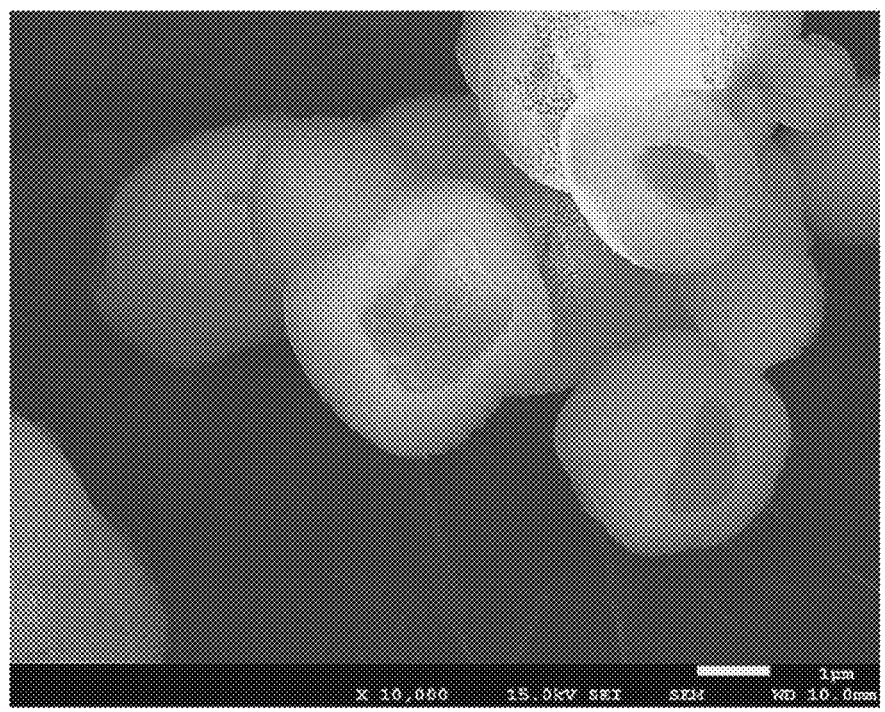
FIG. 6 is an SEM photograph of the product synthesized in Example 3.
Figure 7:
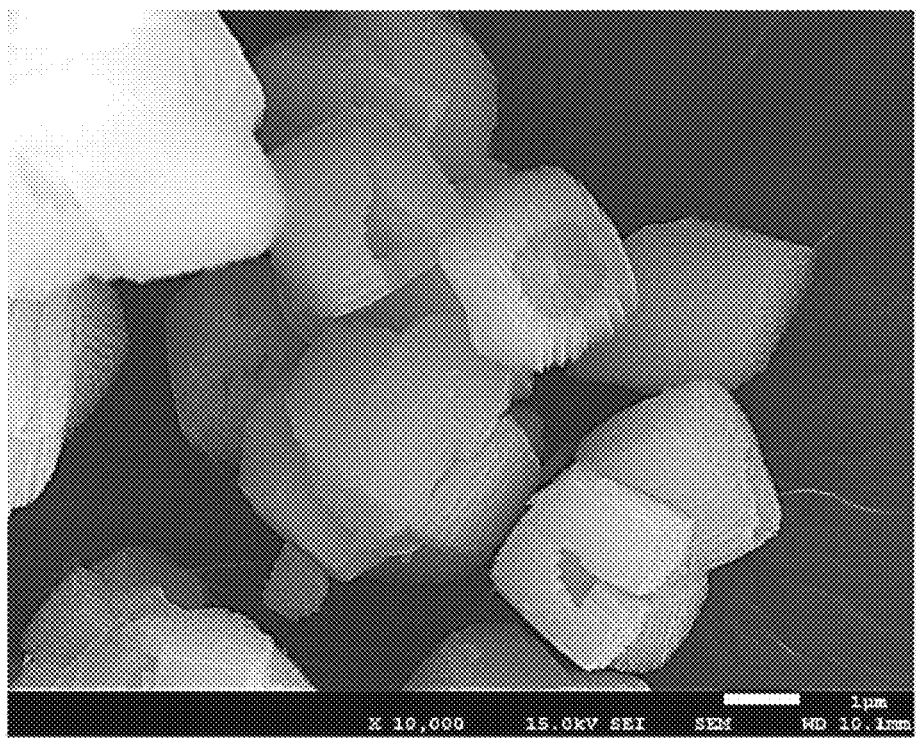
FIG. 7 is an SEM photograph of a product synthesized in Example 5.

The shell is composed of secondary particles formed by aggregation of primary particles and the primary particles constitute the solid portion of the shell. The appearance of the shell may be rounded or polyhedral. A single hollow portion is formed inside a single shell. The single hollow portion is a space defined by being surrounded by the inner surface of the shell, and the single hollow portion is distinguished from minute gaps between the primary particles in the shell formed of the solid portion. The number of hollow portions formed in the shell is typically only one. Preferably, the shell has one or more openings, through which the hollow portion communicates externally, as shown in FIGS. 4, 6 and 7 disclosed below. The primary particles are crystalline, but may also be partially amorphous. Being partially amorphous includes both a case where one primary particle has an amorphous portion and a case where any of a plurality of primary particles is amorphous. In order to obtain a well-shaped shell, the secondary particles preferably consist of crystalline primary particles. When a mordenite zeolite is observed by SEM, only if a single particle formed of the shell and the hollow portion is contained in 100 particles arbitrarily selected of the mordenite zeolite, the mordenite zeolite can be said to have the aforementioned particle morphology. It is more preferred that 10 or more, still more preferred that 20 or more, of such particles are observed. In this case, the number of observation fields is not limited. In the present specification, the primary particle is defined to be an object which can be recognized to be a minimum unit as a particle based on geometrical morphology of appearance.

Examples of the morphology of the opening formed in the shell and enabling the hollow portion to communicate externally may include an opening which opens only in one direction or two or more directions of six directions of the hollow portion: front, rear, right, left, upper and lower directions. When the openings open in two or more directions, the openings in the directions may be separated independently or may be continuous. There may be only one opening or a plurality of openings. As an example of the opening, a morphology shown in FIG. 4 can be exemplified, in which the shell has a pair of openings at positions facing each other by 180 degrees and the hollow portion communicates externally through each opening. In the example shown in FIG. 4, the shell also has an opening in a direction intersecting the direction in which the pair of openings face each other, (specifically in an orthogonal direction in FIG. 4) and the opening is continuous with the pair of the openings.

Examples of the shell shape include a magatama shape (comma-shaped stone), a continuous annular shape, an annular shape having a discontinuous portion and other shapes whose side view is a polygonal frame shape, a U-shape, a C-shape, a shape of a Japanese katakana letter "ko", or the like. The side view shape in this context corresponds to an opposing direction in the case where the pair of openings face each other by 180 degrees. The shell may have a bottomed cylindrical shape (e.g., a square cylindrical shape or a cylindrical shape) with an open end, and may further have an opening on a part of its side surface (e.g., on both opposite side surfaces). This side opening may be continuous with a cylindrical opening.

The particle diameter of a particle having the shell is, for example, such that the maximum length thereof (the length of the longest line segment among line segments connecting two arbitrary points on the particle surface in an image observed by a scanning electron microscope) is, for example, preferably about 100 nm or more and 10,000 nm or less, and more preferably about 1,000 nm or more and 5,000 nm or less. The primary particles preferably have a particle diameter at a maximum length of, for example, about 10 nm or more and 5,000 nm or less, and more preferably about 50 nm or more and 3,000 nm or less. These particle diameters are preferably obtained as an average value of, for example, 10 or more particles.

Subsequently, a method for producing the mordenite zeolite of the present embodiment is disclosed. The present production method is preferred as a method of producing the mordenite zeolite according to the present embodiment and comprises the following steps (1) to (3):

(1) preparing a gel of aluminosilicate comprising divalent metal M by mixing an alkaline aqueous solution comprising a silicon source with an acidic aqueous solution comprising a source for the divalent metal M;

(2) obtaining a reaction mixture wherein a mordenite zeolite as a seed crystal is added to the gel at a ratio of 0.1% by mass or more and 30% by mass or less relative to the silica component in the gel as well as molar ratio NaOH/Si is adjusted to be 0.35 or more and 0.6 or less; and (3) hermetically heating the reaction mixture at a temperature of 100° C. or more and 200° C. or less.

The present inventors have intensively investigated the method for obtaining the mordenite zeolite containing a greater amount of divalent metal M in the skeleton without using an organic structure-directing agent. As a result, it has been found that use of a divalent metal-containing aluminosilicate gel obtained by mixing an alkaline solution containing a particular one of silicon, divalent metal M and aluminum with an acid solution containing a particular one of silicon, divalent metal M and aluminum enables to obtain a mordenite zeolite containing a large amount of divalent metal M in the skeleton without using an organic structure-directing agent.

Examples of a silicon source include silica and a silicon-containing organic compound capable of generating silicate ions in water. To be specific, the silica source may include wet process silica, dry process silica, colloidal silica, sodium silicate and an aluminosilicate gel. These silicon sources can be used singly or in combination of two or more thereof. Among these silicon sources, it is preferable to use an aqueous sodium silicate solution (water glass) from the viewpoint of easy obtainment of an alkaline aqueous solution containing a silicon source and uniformity of the resulting composition.

Examples of the divalent metal M source include salts or particulates of divalent metals. Examples of salts of divalent metals include a sulfate, a nitrate, an acetate and an organic acid salt. Among these, use of a sulfate is particularly preferable from the viewpoint of easy handling.

As an aluminum source, a water-soluble aluminum-containing compound can be used. Specific examples include aluminum nitrate, aluminum sulfate, aluminum hydroxide and the like. These aluminum sources can be used singly or in combination of two or more thereof. Among these aluminum sources, use of an aqueous solution of aluminum sulfate is preferable from the viewpoint of easy handling.

As to the alkaline aqueous solution, for instance, when an aqueous sodium silicate solution is used as the silicon source, this can be used as it is or can be used by diluting with water. When silica such as wet process silica, dry process silica, or colloidal silica is used as the silicon source, aqueous solutions of these may be prepared by dissolving one of them in an aqueous solution of sodium hydroxide, and diluting the obtained solution with water.

$SiO_2$ in an alkaline aqueous solution is preferably 5% by mass or more and 30% by mass or less, and preferably 10% by mass or more and 25% by mass or less. $Na_2O$ in an alkaline aqueous solution is preferably 1% by mass or more and 10% by mass or less, more preferably 3% by mass or more and 8% by mass or less.

The acidic aqueous solution can be prepared by mixing a divalent metal M source, an aluminum source, water and, if necessary, an acid. As the acid, sulfuric acid, nitric acid, acetic acid or the like can be used. When an acid is used, it is preferred that the anions of the salts of the divalent metal M source and/or aluminum source are the same as the anion of the acid.

The contents of M and Al in the acidic aqueous solution are not particularly limited. The contents of M and Al in the acidic aqueous solution may be adjusted so that Si/(M+Al) is a value included in a range of 5 or more and 50 or less, when total amounts of the alkaline aqueous solution and the acidic aqueous solution are mixed together.

When the alkaline aqueous solution and the acidic aqueous solution are mixed with each other, the acidic aqueous solution may be added to the alkaline aqueous solution, the alkaline aqueous solution may be added to the acidic aqueous solution, or both the aqueous solutions may be added to another solution, for example, water, in order to mix them. The addition may be performed at one time or may be performed over time. When the mixing is performed over time, it is preferable to stir and mix the alkaline aqueous solution and the acidic aqueous solution while constantly injecting them at a constant ratio. In addition, a method of continuously discharging the same amount as the injection amount while injecting both liquids at a constant ratio and mixing them is also a preferable method.

The stirring and mixing are preferably performed at a temperature of 25° C. or more and 60° C. or less, more preferably 30° C. or more and 50° C. or less. Further, in the case of stirring and mixing of both solutions over time, the alkali concentration in the alkaline aqueous solution, the acid concentration in the acidic aqueous solution and the injection rate of both solutions are adjusted so that the pH of the mixed solution is always in the neutral region, namely in the range where the pH is 6 or more and 8 or less, preferably 7 or more and 8 or less.

An aluminosilicate gel containing metal M is obtained by solid-liquid separation of an aqueous solution containing a gel obtained by mixing an acidic aqueous solution and an alkaline aqueous solution. The solid-liquid separation can be performed by filtration, centrifugation or the like.

A preferable composition of the divalent metal M-containing aluminosilicate gel includes molar ratio Si/(M+Al) and molar ratio M/(M+Al) in the same ranges as those of the reaction composition disclosed below.

To the divalent metal M-containing aluminosilicate gel obtained in step (1), a seed crystal, which is a mordenite zeolite, is added in step (2) to obtain a reaction mixture.

The mordenite zeolite used as a seed crystal may be a mordenite zeolite which contains silicon and aluminum as a metal element or a metalloid element in the skeleton, and contains no divalent metal M. Alternatively, the mordenite zeolite used as a seed crystal may contain silicon, divalent metal M and aluminum as a metal element or a metalloid element in the skeleton.

Mordenite zeolites are effective as a seed crystal, regardless of difference in production methods. The mordenite zeolites synthesized by the methods disclosed, for instance, in Patent Documents 1 and 2 (those produced using no organic structure directing agent) are also effective and those produced using an organic structure-directing agent are effective as well. The seed crystal may be a seed crystal produced by the method of the present invention or a seed crystal produced by a method other than the method of the present invention. The seed crystal produced by using an organic structure-directing agent may be a seed crystal which has been calcined so as to contain no organic structure-directing agent or may be an unfired seed crystal. These can be used alone or in combination of two or more. The calcination of the seed crystal produced using an organic structure-directing agent is not particularly limited, but is generally performed, for example, in air at 500° C. or more and 700° C. or less for 3 hours or longer and 24 hours or shorter.

The seed crystal is added at a ratio of 0.1% by weight or more and 30% by weight or less with respect to the silica component in the gel. Within this range, a mordenite zeolite having high purity can be produced. From this viewpoint, it is preferable that the seed crystal is added to the gel at a ratio of 1% by mass or more and 30% by mass or less with respect to the silica component in the gel, and it is more preferable that it is added to the gel at a ratio of 5% by mass or more and 20% by mass or less.

A reaction mixture obtained by adding the seed crystal to the gel is subjected to step (3) by setting the molar ratio NaOH/Si to 0.35 or more. Thus, a mordenite zeolite can be obtained. Further, the molar ratio of NaOH/Si being 0.6 or less results in an advantage that a reduction in yield can be avoided. From this point of view, the molar ratio NaOH/Si of the reaction mixture is preferably 0.35 or more and 0.6 or less, and more preferably 0.4 or more and 0.5 or less. The molar ratio NaOH/Si in this context refers to a molar ratio in the part of the reaction mixture other than the seed crystal.

To adjust the NaOH/Si molar ratio of a reaction mixture (a mixture of a divalent metal M-containing aluminosilicate gel, NaOH, water and a seed crystal) to the above range, a required amount of NaOH or an aqueous solution thereof may be added to the divalent metal M-containing aluminosilicate gel. The timing of addition may be simultaneous with, before or after the addition of a seed crystal.

It is further preferred that the reaction mixture has the following molar ratios in order to successfully produce the mordenite zeolite of the present invention. The composition in this context is a composition of the part of the reaction mixture other than the seed crystal.

Si/(M+Al)=5 or more and 50 or less, in particular, 8 or more and 30 or less,

M/(M+Al)=0.1 or more and less than 1, in particular, 0.2 or more and less than 1 and $H_2O$/Si=10 or more and 50 or less, in particular, 10 or more and 20 or less.

The divalent metal M-containing aluminosilicate gel may or may not be heated beforehand (preheating), prior to the addition of a seed crystal. Although it is possible to synthesize the mordenite zeolite even without preheating, preheating is preferable because high-purity crystals can be obtained. When preheating is performed, the preheating condition is preferably 80° C. or more and 200° C. or less from the viewpoint of improvement in purity by preheating and a shortened production time. From the same viewpoint, preheating time is preferably about 5 hours or more and 24 hours or less. Preheating is preferably carried out in a hermetically sealed manner. Here, being in a hermetically sealed manner means that there is no entrance or exit of gas such as water vapor to or from the outside of the system and, for example, it suffices that outflow or inflow of gas such as water vapor to or from the outside of the system is prevented. Preheating is preferably performed by a static method.

After adding a seed crystal to the gel in (2), the resulting reaction mixture is heated in a hermetically sealed manner in step (3). When stirring is performed in order to equalize the reaction mixture temperatures, stirring may be performed in a step of heating in a hermetically sealed manner. Stirring can be performed by mixing with a stirring blade or by rotation of a vessel. The stirring strength and the number of revolutions may be adjusted depending on the uniformity of the temperature and the generation status of impurities. Instead of constant stirring, intermittent stirring may be used. Combination of preheating and stirring may make industrial mass production even easier, as disclosed above. In either the case of performing crystallization under a static state or the case of performing crystallization under a stirred state, the temperature condition of heating for crystallization is preferably 100° C. or more in order to efficiently obtain a mordenite zeolite, and 200° C. or less is preferable in terms of economic advantage without requiring an autoclave having strength withstanding high-pressure and suppressing the generation of impurities. In this respect, the temperature condition is more preferably 120° C. or more and 180° C. or less. The heating time is not critical in the present production method, and the heating may be performed until the mordenite zeolite having sufficiently high crystallinity is created. In general, satisfactory crystalline mordenite zeolites can be obtained by heating for 24 hours or more and 100 hours or less.

Subsequently, the polyvalent metal cation-exchanged body of the present embodiment is explained. The polyvalent metal cation-exchanged body of the present embodiment is a product obtained by ion-exchanging an aluminosilicate which is a mordenite zeolite containing a divalent metal in its skeleton, with a polyvalent metal cation.

The aluminosilicate, which is a mordenite zeolite and contains a divalent metal in its skeleton, refers to a mordenite zeolite containing silicon, divalent metal M and aluminum as a metal element or a metalloid element in the skeleton. This mordenite zeolite preferably has the above-described atomic ratios Si/(M+Al) and M/(M+Al), and preferably has the above atomic ratio Na/(M+Al) when the mordenite zeolite is in the Na-form.

The polyvalent metal cations vary depending on the applications of the exchanged body, but generally, at least one selected from rare earth metal ions such as $Ni^{2+}$, $Cu^{2+}$, $Fe^{2+}$, $Co^{2+}$, $Pd^{2+}$, $La^{3+}$ and $Ce^{3+}$ is preferable from the viewpoint of high adsorption performance or high catalyst performance. Typically, a zeolite substituted with an alkaline metal ion such as Na, or a zeolite of H-form or $NH_4$-form is ion exchanged with a polyvalent metal cation.

The polyvalent metal cation exchange rate in the polyvalent metal cation-exchanged body is preferably 20% or more in order to enhance various kinds of catalyst performance described later and adsorption performance. In the present embodiment, the technical feature that the mordenite zeolite is an aluminosilicate containing a divalent atom in the skeleton enables an increase in the polyvalent metal cation exchange rate. The polyvalent metal cation exchange rate is preferably 100% or less in view of the catalytic reaction characteristics and adsorption characteristics of the polyvalent metal cation-exchanged body. From these points, the polyvalent metal cation exchange rate is more preferably 20% or more and 100% or less, and particularly preferably 30% or more and 100% or less. The polyvalent metal cation exchange rate can be calculated by the following equation on the basis of analysis results of composition analysis using ICP of a zeolite after cation exchange. Polyvalent metal cation exchange rate (%)=(number of a polyvalent metal element after ion exchange per unit cell×ion valence)/(ion exchange capacity of mordenite before ion exchange per unit cell) Here, the ion exchange capacity of a mordenite before ion exchange per unit cell can be calculated by Si/(M+Al) ratio and M/(M+Al) ratio of the mordenite.

The polyvalent metal cation-exchanged body of the present embodiment is promising as a catalyst or an adsorbent. Examples of catalysts expected to have high activity by the polyvalent metal cation-exchanged body of the present embodiment include oligomerization catalysts of light olefins and oxidation catalysts. Examples of adsorbents expected to have high activity by the polyvalent metal cation-exchanged body of the present embodiment include NOx adsorbents, CO adsorbents, hydrocarbon adsorbents and the like.

Particularly, among polyvalent metal cation-exchanged bodies, a nickel cation-exchanged body of aluminosilicate zeolite is known to act as an oligomerization catalyst for light olefins, and many reports have been made as catalysts having high oligomerization activity. Oligomerization reactions are important because they convert light olefins, which can be obtained in large quantities from FCC plants and steam crackers, into higher value-added hydrocarbons. The oligomerization is carried out industrially under the action of a homogeneous or heterogeneous catalyst. As the process under the action of a homogeneous catalyst, a method is known, in which an oligomerization catalyst comprising a titanium complex, a nickel complex and alkyl aluminum is used in a liquid phase, but the catalyst must be separated from the reaction mixture. This renders the process complicated. Furthermore, homogeneous catalysts cannot be regenerated. There are no such problems when heterogeneous catalysts are used. As a method using a heterogeneous oligomerization catalyst, a method is also known in which a catalyst comprising nickel loaded on a support comprising silica, a support comprising alumina and a support comprising silica and alumina or the like is used and the oligomerization is performed in a liquid phase or a gas phase. For example, Journal of Catalysis 296 (2012) pp. 156-164 reports that when nickel cation-exchanged aluminosilicate zeolite was used as an oligomerization catalyst, the main product was hexene, which is a dimer, and nonene, which is a trimer, was also obtained. However, as shown in ACS Catalysis, Vol. 4 (2014) pp. 4189-4195, in a conventional nickel cation-exchanged aluminosilicate zeolite, aluminum in the skeleton to which Ni is not bonded becomes a strong Brønsted acid point, and causes problems such as acceleration of side reactions and catalyst degradation due to coking. Contrary to this, in the exchanged body of the present embodiment, when the divalent metal M in the skeleton exists in a four coordinate state, the divalent metal M can be independently bonded to the Ni cation, so that the proportion of the intraskeletal divalent metal M to which no Ni cation is bonded is expected to be small. In addition, the acid strength is lower than that of aluminum, and there is less risk of causing side reactions.

EXAMPLES

Hereinafter, the present invention is disclosed in more detail with reference to the Examples. However, the scope of the present invention is not limited to such Examples. Unless particularly stated, the terms "%" and "part(s)" intend "% by mass" and "part(s) by mass", respectively. Analytical instruments used in the following Examples and Comparative Examples are as follows.

Powder X-ray diffractometer: Ultima IV manufactured by Rigaku, Cuka ray used, voltage: 40 kV, electric current: 40 mA, scan step: 0.02° and scan speed: 2°/min. Composition analyzer: ICP-AES LIBERTY Series II manufactured by Varian, Inc. Scanning electron microscope: Field emission type scanning electron microscope S-900 manufactured by Hitachi High-Technologies Corporation. BET specific surface area measurement apparatus: AUTOSORB iQ2, manufactured by Qantachrome Instruments. Fixed-bed flow-through reactor: Atmospheric pressure stationary phase flow-through reactor using quartz tube reactor (inner diameter: 8 mm). Online GC (Shimadzu, GC2014) was used for the analysis.

Reference Example 1

Synthesis Example of Zincoaluminosilicate Gel Used for the Synthesis of Mordenite Zeolite A 1000-mL plastic container was charged with 715.3 g of pure water and 400.0 g of water glass (soda silicate No. 3, $Na_2O$: 9.37%, $SiO_2$: 28.96, $H_2O$: 61.67%) was mixed therewith to obtain an aqueous solution 1. In another 250-mL plastic container, 145.5 g of pure water was placed, and 7.782 g of zinc sulfate, 119.9 g of 27.52% aluminum sulfate aqueous solution and 21.0 g of 64% sulfuric acid aqueous solution were mixed to obtain an aqueous solution 2. The containers containing aqueous solution 1 and aqueous solution 2 each were placed in a water bath and the water temperature was maintained at 40° C. Aqueous solution 1 and aqueous solution 2 were supplied to a plastic container containing about 100 mL of water held at 40° C. in a separate water bath with stirring, at 20 mL/min and 5 mL/min, respectively, using a liquid feed pump. On the other hand, the mixed solution was discharged from the top of the container at a rate of 25 mL/min, and the discharged solution was collected. During feeding, the mixed solutions were constantly pH7 to 8. A solution obtained by mixing all of aqueous solution 1 and aqueous solution 2 was placed in a 2,000 mL plastic container and stirred at room temperature for 2 days. The obtained solution was separated into a solid and a liquid by a centrifugal separator, and the solid was washed with 4,500 mL of pure water. After washing, the solid was centrifuged at 800 rpm for 15 minutes and then at 3,000 rpm for 5 minutes to remove the contained water. When the obtained gel was analyzed for composition, it was found to be a zincoaluminosilicate of Si/(Zn+Al)=8 and Zn/(Zn+Al)=0.2. The obtained gel was heated at 600° C. in a muffle furnace, and the moisture content was calculated by measuring the mass difference between before and after, and this moisture content was used for the synthesis of zeolite.

Reference Example 2

A zincoaluminosilicate gel having a molar ratio of Si/(Zn+Al)=8 and Zn/(Zn+Al)=0.3 was prepared in the same manner as in Reference Example 1.

Reference Example 3

A zincoaluminosilicate gel having a molar ratio of Si/(Zn+Al)=8 and Zn/(Zn+Al)=0.4 was prepared in the same manner as in Reference Example 1.

Reference Example 4

A zincoaluminosilicate gel having a molar ratio of Si/(Zn+Al)=8 and Zn/(Zn+Al)=0.5 was prepared in the same manner as in Reference Example 1.

Reference Example 5

A zincoaluminosilicate gel having a molar ratio of Si/(Zn+Al)=8 and Zn/(Zn+Al)=0.6 was prepared in the same manner as in Reference Example 1.

Reference Example 6

An aluminosilicate gel having a Si/Al of 8 was prepared in the same manner as in Reference Example 1, except that zinc sulfate was not added. An aluminosilicate mordenite zeolite was synthesized by heating this gel at 150° C. for 53 hours in the same manner as in Example 1. As a result of the composition analysis, the Si/Al atomic ratio was confirmed to be 5.23. A photograph of the product taken with a scanning electron microscope is shown in FIG. 1. As shown in FIG. 1, the aluminosilicate mordenite zeolite of Reference Example 6 does not have a hollow portion surrounded by a shell.

Example 1

Figure 2:
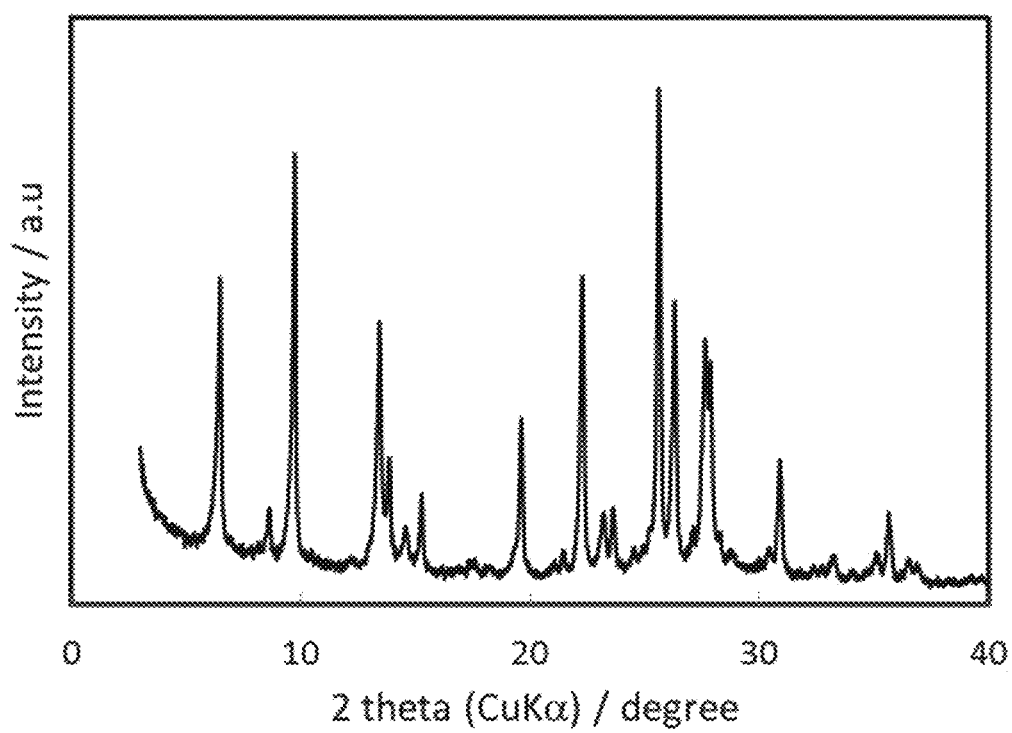
FIG. 2 is an X-ray diffraction pattern of a product synthesized in Example 1.
Figure 3:
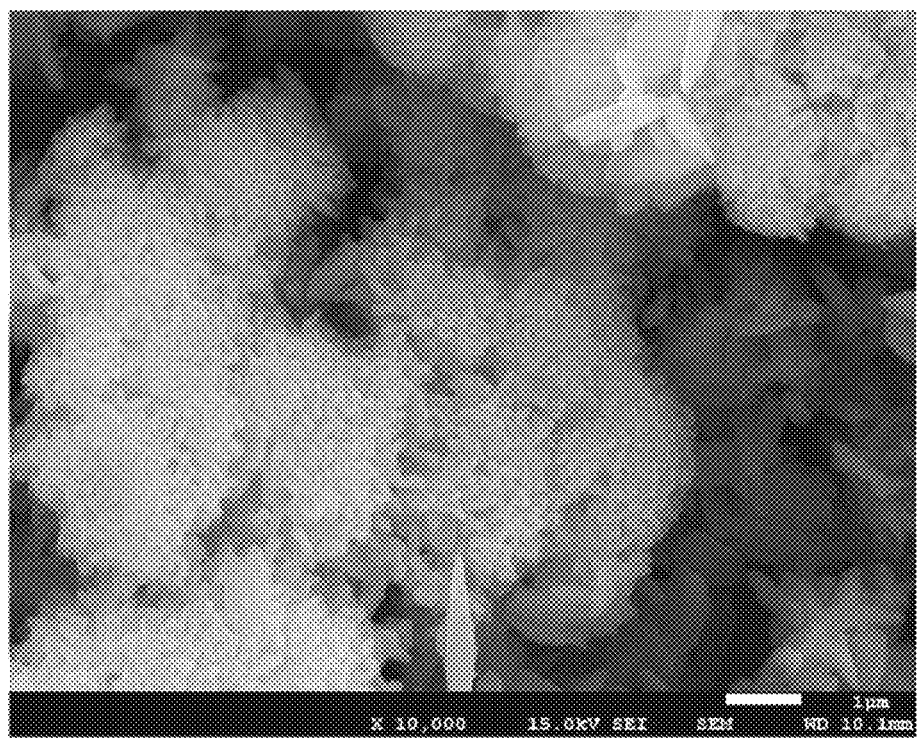
FIG. 3 is an SEM photograph of a seed crystal used in Example 1.

To an aqueous solution obtained by adding 1.773 g of a 36% aqueous solution of sodium hydroxide to 1.465 g of pure water, 0.309 g of crystals of a powdery mordenite zeolite (HSZ-640NAA manufactured by Tosoh Corporation) as a seed crystal was added and mixed uniformly, and then 15 g of the zincoaluminosilicate gel prepared in Reference Example 1 was added and mixed uniformly. The reaction mixture was placed in a 60 ml hermetically sealed stainless-steel vessel and heated at 150° C. under autogenous pressure without agitation for 72 hours. After cooling the hermetically sealed vessel, the product was filtered and washed with warm water to obtain a white powder. As a result of X-ray diffraction measurement of this product, it was confirmed that this product was a mordenite zeolite containing no impurities as shown in FIG. 2. A photograph of the seed crystal taken with the scanning electron microscope is shown in FIG. 3, and a photograph of the product taken in the same manner is shown in FIG. 4. As shown in FIG. 4, the mordenite-type zeolite of Example 1 has a form of particles composed of a shell consisting of a solid portion and a hollow portion existing inside the shell. The shell has a pair of openings at positions 180 degrees opposite to each other, the hollow portion communicates externally through each opening, and the shell also opens in a direction orthogonal to the direction in which the pair of openings oppose, and the opening is continuous with the pair of openings. The Si/(Zn+Al) atomic ratio and the Zn/(Zn+Al) atomic ratio, and the Na/(Zn+Al) atomic ratio in the Na-form state obtained from the results of the composition analysis were as shown in Table 1. The BET specific surface area and micropore volume measured by nitrogen adsorption in the Na-form state are shown in Table 1.

Examples 2 to 5

Figure 5:
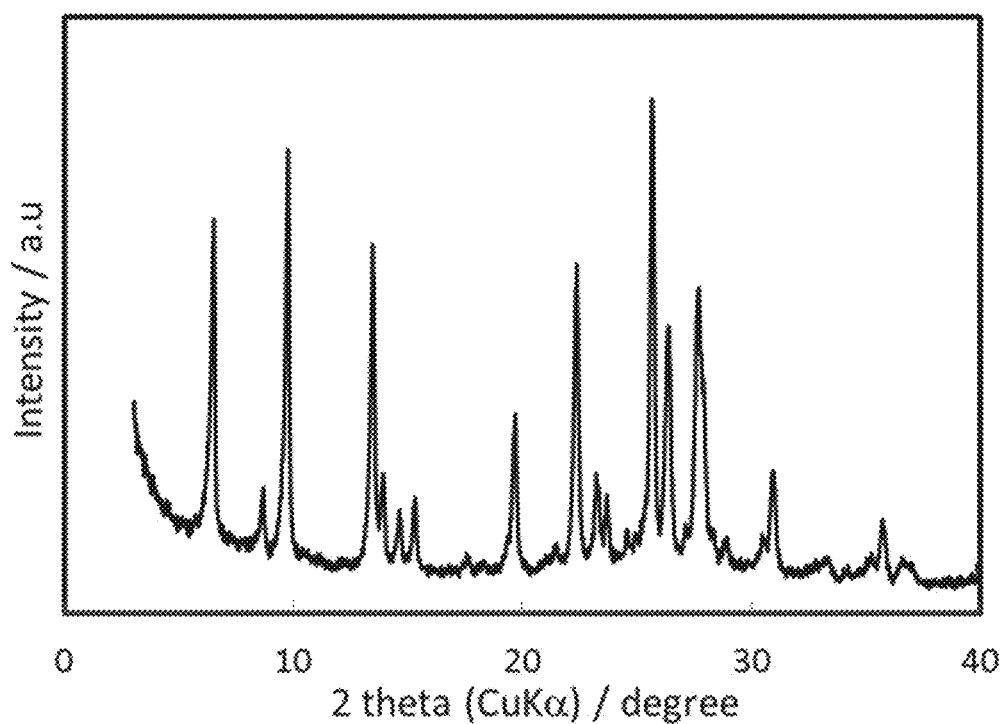
FIG. 5 is an X-ray diffraction pattern of a product synthesized in Example 3.

Reaction mixtures having the compositions disclosed in Table 1 were prepared using the zincoaluminosilicate gel of Si/(Zn+Al)=8 and Zn/(Zn+Al)=0.3 to 0.6 prepared in Reference Examples 2 to 5, and zeolites were synthesized in the same manner as in Example 1 under the conditions disclosed in Table 1. After cooling the hermetically sealed vessels, the products were filtered and washed with warm water to obtain white powders. As results of X-ray diffraction measurements of these products, it was confirmed that the products each were a mordenite zeolite containing no impurities. An X-ray diffraction pattern of the product of Example 3 is indicated in FIG. 5. Photographs of the products of Examples 3 and 5 taken by the scanning electron microscope are shown in FIGS. 6 and 7, respectively. The Si/(Zn+Al) atomic ratio, the Zn/(Zn+Al) atomic ratio, and the Na/(Zn+Al) atomic ratio in the Na-form state obtained from the results of the composition analysis were as shown in Table 1. The BET specific surface areas and micropore volumes measured by nitrogen adsorption in the Na-form state are shown in Table 1. For Example 6, the adsorption amount was measured in the H-form. As shown in FIGS. 6 and 7, the mordenite zeolites of Examples 3 and 5 have the form of particles composed of a shell consisting of a solid portion and a hollow portion existing inside the shell. The shell has at least one opening through which the hollow portion communicates externally.

Comparative Examples 1, 2

Reaction mixtures having the compositions disclosed in Table 2 were prepared using the zincoaluminosilicate gel of Si/(Zn+Al)=8 and Zn/(Zn+Al)=0.4 prepared in Reference Example 3, and synthesis was performed in the same manner as in Example 1 under the conditions disclosed in Table 2. After cooling the hermetically sealed vessels, the products were filtered and washed with warm water to obtain white powders. As results of the X-ray diffraction measurements of these products, these products were amorphous materials each containing a trace amount of mordenite zeolite.

Comparative Example 3

A reaction mixture having the composition disclosed in Table 2 was prepared using the zincoaluminosilicate gel of Si/(Zn+Al)=8 and Zn/(Zn+Al)=0.2 prepared in Reference Example 1, and a synthesis was performed in the same manner as in Example 1 under the conditions disclosed in Table 2. After cooling the hermetically sealed vessel, the product was filtered and washed with warm water to obtain a white powder. As a result of X-ray diffraction measurement of this product, the product was confirmed to be an amorphous material.

Comparative Example 4

A reaction mixture having the composition shown in Table 2 was prepared by mixing fumed silica (Cab-O-Sil, M-5) as a silica source, zinc acetate as a zinc source, and sodium aluminate as an aluminum source without using the gels prepared by the methods shown in the Reference Examples. Hydrothermal synthesis was carried out in the same manner as in Example 1, and after the hermetically sealed vessel was cooled, the product was filtered and washed with warm water to obtain a white powder. As a result of X-ray diffraction measurement of this product, this product was confirmed to be a mordenite zeolite. However, the Zn/(Zn+Al) atomic ratio determined by the composition analysis was 0.06.

ammonium form mordenite sample 1 g was added to 100 g of an aqueous solution of nickel nitrate (0.01 mol/L), held at 60° C. for one day, and then washed with distilled water three times. After washing and drying, the composition was analyzed. The polyvalent metal cation exchange rate (%) was obtained from the amounts of Ni, Si, Zn and Al obtained by the composition analysis, using the above formula.

TABLE 3

| Example, Comparative Example | Used zeolite | Ni ion exchange rate (%) |
| --- | --- | --- |
| Example 6 | Product of Example 1 | 54 |
| Example 7 | Product of Example 3 | 77 |
| Comparative Example 5 | Product of Reference Example 6 | 47 |

As shown in Table 3, it was found that the zinc-containing mordenite zeolite of Example 3 had a higher $Ni^{2+}$ cation exchange rate than the mordenite zeolite of Reference Example 6, which contained no zinc.

TABLE 1

| | Composition of reaction mixture (Molar ratio) | | | | Seed crystal Added | Crystallization conditions | | Product | | | | BET | |
| --- | --- | --- | --- | --- | --- | --- | --- | --- | --- | --- | --- | --- | --- |
| Example | Si/ (Zn + Al) | Zn/ (Zn + Al) | NaOH/ Si | $H_2O$/ $SiO_2$ | amount % by mass | Temperature ° C. | Time h | Zeolite | Si/ (Zn + Al) | Zn/ (Zn + Al) | Na/ (Zn + Al) | surface area $m^2/g$ | Micropore volume cc/g |
| 1 | 8 | 0.2 | 0.46 | 15 | 10 | 150 | 72 | Mordenite | 5.39 | 0.187 | 1.09 | 410 | 0.14 |
| 2 | 8 | 0.3 | 0.46 | 15 | 10 | 150 | 72 | Mordenite | 5.62 | 0.288 | 1.08 | 400 | 0.14 |
| 3 | 8 | 0.4 | 0.46 | 15 | 10 | 150 | 72 | Mordenite | 5.94 | 0.390 | 1.06 | 380 | 0.13 |
| 4 | 8 | 0.5 | 0.46 | 15 | 10 | 150 | 72 | Mordenite | 6.13 | 0.486 | 1.25 | 350 | 0.12 |
| 5 | 8 | 0.6 | 0.46 | 15 | 10 | 150 | 72 | Mordenite | 6.37 | 0.583 | 1.40 | 310 | 0.11 |

TABLE 2

| Comparative Example | Composition of reaction mixture (Molar ratio) | | | | Seed crystal Added | Crystallization conditions | | Product |
| --- | --- | --- | --- | --- | --- | --- | --- | --- |
| | Si/ (Zn + Al) | Zn/ (Zn + Al) | NaOH/ Si | $H_2O$/ $SiO_2$ | amount % by mass | Temperature ° C. | Time h | |
| 1 | 8 | 0.4 | 0.20 | 15 | 10 | 150 | 72 | Amorphous material |
| 2 | 8 | 0.4 | 0.30 | 15 | 10 | 150 | 72 | Amorphous material |
| 3 | 8 | 0.2 | 0.46 | 15 | 0 | 150 | 120 | Amorphous material |
| 4 | 8 | 0.4 | 0.46 | 15 | 10 | 150 | 72 | Mordenite |

Examples 6, 7, Comparative Example 5

[Ion Exchange of Zincosilicate Zeolite]

Ion exchange with nickel metal cation ($Ni^{2+}$) was carried out using the zincosilicate mordenite zeolites synthesized in Examples 1 and 3, and exchanged amounts by $Ni^2$ cation were measured. As a comparison, the aluminosilicate mordenite synthesized without using zinc in Reference Example 6 was also subjected to ion exchange and analysis. The zeolitic sample 1 g was added to 100 ml of an aqueous ammonium nitrate solution (0.1 mol/L) and kept at 60° C. for one day, and then the step of washing with distilled water was repeated three times to obtain an ammonium form. The Example 8, Comparative Example 6

[Zincosilicate Zeolites-Catalyzed Oligomerization]

The $Ni^{2+}$ cation-exchanged mordenite zeolites obtained in Example 7 and Comparative Example 5 were used to test the activity of the reaction as an oligomerization of propylene in a fixed bed flow-through reactor. A 1 inch diameter quartz-tube reactor (length: 0.3 m, inner diameter: 8 mm) was filled with 0.01 g of Ni cation-exchanged mordenite zeolite and nitrogen gas was flowed at 10 $cm^3$/min to perform pre-treatment at 350° C. for 2 hours. Thereafter, the temperature was lowered to 200° C., held for 30 minutes, waiting for stabilization, then the gas was switched to a mixed gas of propylene gas (5 cm³/min) and nitrogen gas (10 cm³/min), held for 1 hour, and the conversion rate (%) of propylene was measured. The conversion rate (%) of propylene was obtained by the following formula. The results are shown in Table 4.

Propylene conversion rate (%)={(carbon mass of supplied propylene−carbon mass of unreacted propylene)/carbon mass of supplied propylene}×100

TABLE 4

| Example, Comparative Example | Used zeolite | Propylene conversion rate (%) |
|---|---|---|
| Example 8 | Product of Example 7 | 96 |
| Comparative Example 6 | Product of Comparative Example 5 | 87 |

As shown in Table 4, the conversion rate was higher when the zincosilicate mordenite zeolite was used than that when the aluminosilicate mordenite zeolite was used. The reason for this is considered to be in that the ion-exchange rate of $Ni^{2+}$ is high in the case of zincosilicate, and coking is suppressed and the degradation rate is low because the acid strength is low.

The invention claimed is:

1. A mordenite zeolite containing a silicon, a divalent metal M and an aluminum in a skeletal structure, wherein the mordenite zeolite has the following atomic ratios in the state of Na-form,
Si/(M+Al)=5 or more and 10 or less,
M/(M+Al)=0.2 or more and less than 1, and
Na/(M+Al)=1 or more and less than 2.

2. The mordenite zeolite according to claim 1, wherein the mordenite zeolite has a BET specific surface area of 250 m²/g or more and 500 m²/g or less and a micropore volume of 0.07 cc/g or more and 0.25 cc/g or less in the state of Na-form or H-form.

3. The mordenite zeolite according to claim 1, wherein the mordenite zeolite is in the form of particles each comprising a shell formed of a solid portion and a hollow portion existing inside the shell.

4. The mordenite zeolite according to claim 3, wherein the shell has one opening and the hollow portion communicates externally through the opening.

5. The mordenite zeolite according to claim 3, wherein the shell comprises a pair of openings in positions facing each other in a degree of 180°, and wherein the hollow portion communicates externally through each of the openings.

6. The mordenite zeolite according to claim 5, wherein the shell further comprises an opening in a direction intersecting a direction in which the pair of openings face each other, and the opening is continuous with the pair of openings.

7. A method of producing the mordenite zeolite according to claim 1, the method comprising the steps of:
(1) preparing a gel of aluminosilicate comprising divalent metal M by mixing an alkaline aqueous solution comprising a silicon source with an acidic aqueous solution comprising a source for the divalent metal M and an aluminum source;
(2) obtaining a reaction mixture by adding a mordenite zeolite as a seed crystal to the gel at a ratio of 0.1% by mass or more and 30% by mass or less relative to the silica component in the gel and adding an aqueous NaOH solution so that molar ratio NaOH/Si is adjusted to 0.35 or more and 0.6 or less and; and
(3) hermetically heating the reaction mixture at a temperature of 100° C. or more and 200° C. or less.

8. The method of producing a mordenite zeolite according to claim 7, wherein the reaction mixture has a composition represented by the molar ratios indicated below:
Si/(M+Al)=5 or more and 50 or less,
M/(M+Al)=0.1 or more and less than 1, and
H₂O/Si=10 or more and 50 or less.

9. The production method according to claim 7, wherein the reaction mixture containing no crystal seed is hermetically heated at a temperature of 80° C. or more and 200° C. or less, and then the seed crystal is added to the reaction mixture and the reaction mixture is further hermetically heated at a temperature of 100° C. or more and 200° C. or less.

10. The production method according to claim 7, wherein the reaction mixture is stirred in the hermetical heating step.

11. The production method according to claim 7, wherein the mordenite zeolite used as the seeding crystal is a mordenite zeolite comprising silicon and aluminum and no divalent metal M in the skeletal structure or a mordenite zeolite comprising silicon, divalent metal M and aluminum in the skeletal structure.

12. A polyvalent metal cation-exchanged body of a mordenite zeolite, wherein the mordenite zeolite is an aluminosilicate comprising a divalent metal in its skeletal structure and having the following atomic ratio: M/(M+Al)=0.2 or more and less than 1.

13. A catalyst comprising the polyvalent metal cation-exchanged body according to claim 12.

14. An adsorbent comprising the polyvalent metal cation-exchanged body according to claim 12.

* * * * *